United States Patent [19]

Tolksdorf et al.

[11] Patent Number: 4,712,855
[45] Date of Patent: Dec. 15, 1987

[54] PLANAR OPTICAL WAVEGUIDE AND METHOD OF MANUFACTURING SAME

[75] Inventors: Wolfgang F. M. Tolksdorf, Tornesch; Inske E. H. Bartels, Pinneberg; Hans O. B. Dammann, Tangstedt; Claus-Peter Klages; Elke B. Pross, both of Hamburg, all of Fed. Rep. of Germany

[73] Assignee: U.S. Philips Corporation, New York, N.Y.

[21] Appl. No.: 818,152

[22] Filed: Jan. 13, 1986

[30] Foreign Application Priority Data

Apr. 20, 1985 [DE] Fed. Rep. of Germany ....... 3514413

[51] Int. Cl.⁴ .............................................. G02B 6/10
[52] U.S. Cl. ................................ 350/96.12; 350/96.10; 350/96.30
[58] Field of Search ............... 350/96.11, 96.12, 96.13, 350/96.14, 96.30, 96.34

[56] References Cited

U.S. PATENT DOCUMENTS 3,764,195 10/1973 Blank et al. ....................... 350/96.13
4,236,782 12/1980 Caserta et al. ................ 350/96.12 X

FOREIGN PATENT DOCUMENTS 0175425 3/1986 European Pat. Off. .

OTHER PUBLICATIONS

"Integrated Optic: A Report On The 2nd OSA Topical Meeting Pole et al., Applied Optics, vol. 14, No. 3, Mar. 1975.
Tolksdorf, W. et al. "Compositional Inhomogeneities Along The Growth Direction Of Substituted Yttrium Iron Garnet Epilayers." *Journal of Crystal Growth*, vol. 52, pp. 722–728 (1981).

*Primary Examiner*—William L. Sikes
*Assistant Examiner*—Akm E. Ullah
*Attorney, Agent, or Firm*—Marc D Schechter

[57] ABSTRACT

Planar optical waveguide having a crystal body consisting of a nonmagnetic substrate having a first magnetooptical layer epitaxially provided on the substrate and a second magnetooptical layer epitaxially provided on the first mangetooptical layer. The two magnetooptical layers consist of a material based on iron garnet. The second magnetooptical layer has a refractice index $n_2$ which is approximately $1 \times 10^{-3}$ to $1 \times 10^{-2}$ higher than the refractive index $n_1$ of the first magnetooptical layer. A layer of a material based on iron garnet and absorbing radiation in the wavelength range of $1.0 \leq \lambda \leq 2.5$ μm is provided between the substrate and the first magnetooptical layer, said iron garnet-based layer having a refractive index $n_A$ which is higher than the refractive index of the first magnetooptical layer.

20 Claims, 4 Drawing Figures

PLANAR OPTICAL WAVEGUIDE AND METHOD OF MANUFACTURING SAME

BACKGROUND OF THE INVENTION

The invention relates to a planar optical waveguide having a crystal body consisting of a nonmagnetic substrate having a first magnetooptical layer epitaxially provided on the substrate and a second magnetooptical layer epitaxially provided on the first magnetooptical layer. The two magnetooptical layers consist of a material based on iron garnet. The second magnetooptical layer has a refractive index $n_2$ which is approximately $1 \times 10^{-3}$ to $1 \times 10^{-2}$ higher than the refractive index $n_1$ of the first magnetooptical layer.

The invention further relates to a method of manufacturing an optical waveguide of this type and to its use.

In optical communication by means of optical glass fibres, one-way waveguides are used as optical isolators or possibly also as optical circulators to protect the semiconductor laser diodes from light reflected from the connected section. The nonreciprocal properties of magnetooptical materials are utilized on account of the Faraday effect.

Planar optical one-way waveguides which are realized by layers of a magnetooptical material provided epitaxially on a substrate must have a layer thickness of the radiation-conducting layer which is adapted to the dimensions of the optical fibres to be connected. Monomode optical fibres have, for example, a core diameter in the range of 5 to 10 $\mu$m. Therefore, the layer thickness of the radiation-conducting layer of a monomode waveguide should also be in the range of 5 to 10 $\mu$m.

Layers of these dimensions can be manufactured by means of liquid phase epitaxy (LPE) from highly diluted molten solutions in which the solvent conventionally consists of a mixture of PbO and $B_2O_3$. Suitable as a material for the magnetooptical layer is, for example, yttrium iron garnet ($Y_3Fe_5O_{12}$) and suitable for the substrate on which such layers grow epitaxially is, for example, gadolinium gallium garnet ($Gd_3Ga_5O_{12}$) in the form of a commercially available 0.5 mm thick single crystal slice oriented in the (111)-direction. For the magnetooptical layers other iron garnets are also suitable such as, for example, $Gd_3Fe_5O_{12}$ or bismuth-substituted iron garnets.

In optical communication by means of optical fibres, the monomode technique is used for a high-grade data transmission. The planar optical waveguide referred to in the opening paragraph operates with two magnetooptical iron garnet layers having a small refractive index difference between the two magneto-optical layers, so that the second iron garnet layer adjoining the first layer provided on the substrate is a monomode waveguide in the case of a thickness of 5 to 10 $\mu$m.

Due to the relatively large refractive index difference between the substrate and the first magnetooptical layer further modes can be additionally propagated in the entire magnetooptical double layer. For an optimum monomode operation this effect is unwanted.

SUMMARY OF THE INVENTION

It is an object of the invention to improve the planar optical waveguide referred to in the opening paragraph in such a manner that the propagation of unwanted modes is prevented with certainty.

According to the invention this object is achieved in that a layer of a material based on iron garnet and absorbing radiation in the wavelength range of $1.0 \leq \lambda \leq 2.5$ $\mu$m is provided between the substrate and the first magnetooptical layer, said iron garnet-based layer having a refractive index $n_4$ which is higher than the refractive index of the first magnetooptical layer.

A method of manufacturing a planar optical waveguide of this type is characterized in that a layer of a material based on iron garnet and absorbing radiation in the wavelength range of $1.0 \leq \lambda \leq 2.5$ $\mu$m is epitaxially deposited on a nonmagnetic substrate and that two magnetooptical layers having a refractive index difference $\Delta n$ in the range of $1 \times 10^{-3}$ to $1 \times 10^{-2}$ are epitaxially deposited on said absorption layer. By incorporation in the garnet lattice of ions absorbing radiation in the wavelength range of $1.0 \leq \lambda \leq 2.5$ $\mu$m and by the choice of the composition, the absorption layer is given a refractive index $n_4$ which is higher than the refractive index $n_1$ of the first magnetooptical layer adjoining the absorption layer.

The invention is based on the recognition of the fact that the propagation of unwanted modes can be prevented when an intermediate layer absorbing radiation in the spectral range of $1.0 \leq \lambda \leq 2.5$ $\mu$m is provided between the substrate and the magnetooptical double layer, which intermediate layer has a refractive index $n_4$ which is slightly higher than the refractive index $n_1$ of the first magnetooptical layer adjoining the absorption layer. In this manner further modes that are unwanted for monomode operation are greatly attenuated on passing through the absorption layer so that their propagation is suppressed. It was found that particularly $Co^{III}$ and/or $Co^{II}$ in combination with quadrivalent ions such as $Si^{IV}$, $Ge^{IV}$, $Ti^{IV}$ and/or $Zr^{IV}$ change the refractive index of the absorption layer and act in an absorptive manner on radiation in the wavelength range of $1.0 \leq \lambda \leq 2.5$ $\mu$m.

According to a further advantageous embodiment of the invention the material of the absorption layer in the garnet lattice includes at least one substituent in the form of a cation, which can occupy dodecahedral, octahedral and/or tetrahedral lattice sites, while in accordance with a further advantageous embodiment of the invention the absorption layer has a composition defined by the general formula $Y_3Fe_{5-x-y-z}A_xD_yM_zO_{12}$, in which $A = Co^{III}$, $D = Co^{II}$ and $M = Si^{IV}$, $Ge^{IV}$, $Ge^{IV}$, $Ti^{IV}$, $Zr^{IV}$ and/or mixtures of these ions, where $0 \leq x \leq 0.3$; $0 \leq y \leq 0.3$; $z \geq y$; $0 \leq y+z \leq 0.6$. $x+y+z \leq 0.6$; $x+y > 0$ and where $z = 0$ when $y = 0$.

According to further advantageous embodiments of the invention ferrimagnetic absorption layers defined by the formulas

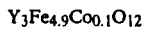
$Y_3Fe_{4.9}Co_{0.1}O_{12}$

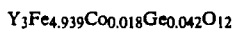
$Y_3Fe_{4.939}Co_{0.018}Ge_{0.042}O_{12}$ or

$Y_3Fe_{4.73}Co_{0.12}Si_{0.15}O_{12}$ are deposited on the substrate. The manufacture of an absorption layer of the composition $Y_3Fe_{4.9}Co_{0.1}O_{12}$ will be described as an example.

It is to be noted that although a solvent in the form of PbO and $B_2O_3$ was used, the boron content in the growing layer was negligibly small.

BRIEF DESCRIPTION OF THE DRAWING

In the Figures

DESCRIPTION OF THE PREFERRED EMBODIMENTS

Figure 1:
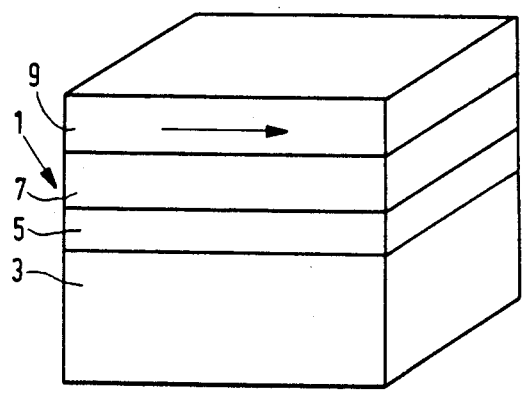
FIG. 1 is a principle representation of a planar optical one-way waveguide according to the invention.

FIG. 1 shows a planar optical waveguide 1 having a substrate 3 of $Gd_3Ga_5O_{12}$ which consists of a 500 $\mu$m thick single crystal slice oriented in the (111)-direction. An epitaxial $Y_3Fe_{4.9}Co_{0.1}O_{12}$ layer is provided as a ferrimagnetic absorption layer 5 having a refractive index $n_A$ of 2.224. An epitaxial $Y_{2.934}Pb_{0.066}Fe_5O_{12}$ layer having a refractive index $n_1$ of 2.220 is provided as a first magnetooptical layer 7.

An epitaxial $Y_{2.91}Pb_{0.09}Fe_5O_{12}$ layer having a refractive index $n_2$ of 2.224 is provided as a second magnetooptical layer 9. The refractive index difference $\Delta n = n_2 - n_1$ is $4.0 \times 10^{-3}$. The refractive index difference between the absorption layer 5 and the first magnetooptical layer 7 is $n_A - n_1 = 4 \times 10^{-3}$.

For the manufacture of both the magnetooptical layers 7 and 9 and the ferrimagnetic absorption layer 5 the liquid phase epitaxy method known, for example, from Journal of Crystal Growth 52 (1981) pages 722 to 728 was used with a horizontally clamped 0.5 mm thick $Gd_3Ga_5O_{12}$ single crystal slice oriented in the (111)-direction having a diameter of 30 mm as a substrate 3. Either a melt I or a melt II was used for the manufacture of the magnetooptical layers 7 and 9. A melt III was used for the manufacture of the ferrimagnetic absorption layer 5.

The melts I, II and III had the following compositions in relation to the oxides used (in % by weight):

|  | I | II | III |
|---|---|---|---|
| PbO | 90.88 | 87.14 | 89.27 |
| $B_2O_3$ | 1.99 | 3.40 | 1.95 |
| $Fe_2O_3$ | 6.46 | 8.70 | 6.35 |
| $Y_2O_3$ | 0.67 | 0.76 | 0.66 |
| $Co_2O_3$ | — | — | 1.77 |

The compositions (cation share in the melt) of the melts I to III are shown in the following Table:

TABLE I

| | Melt composition | | |
|---|---|---|---|
| | Cation share in the melt [atom %] | | |
| Cations | Melt I | Melt II | Melt III |
| Pb | 73.87 | 64.66 | 71.08 |
| B | 10.37 | 16.18 | 9.98 |
| Fe | 14.68 | 18.05 | 14.12 |
| Y | 1.08 | 1.11 | 1.03 |
| Co | — | — | 3.79 |

Figure 2:
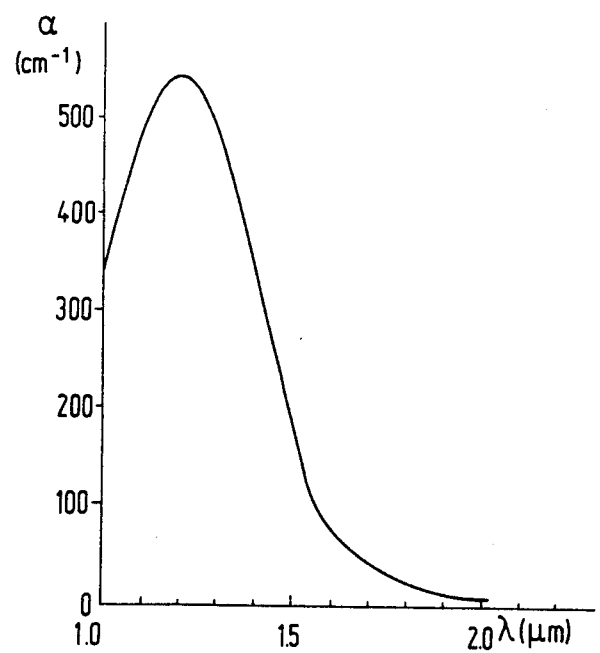
FIGS. 2 to 4 show the absorption behaviour of absorption layers according to the invention with respect to radiation in the near infrared range.

The ferrimagnetic absorption layer 5 was epitaxially deposited at a growth temperature of the melt $T_g$ of 865° C. with a layer thickness d of 6 $\mu$m from the melt III whose composition is shown in Table 1. It had a refractive index $n_A$ of 2.224. The absorption of this layer of radiation in the wavelength range of $1.0 \leq \lambda \leq 2.0$ $\mu$m is shown in FIG. 2; it was sufficient to suppress multimode transmission in the magnetooptical double layer 7,9 epitaxially grown on the ferrimagnetic absorption layer 5.

Figure 3:
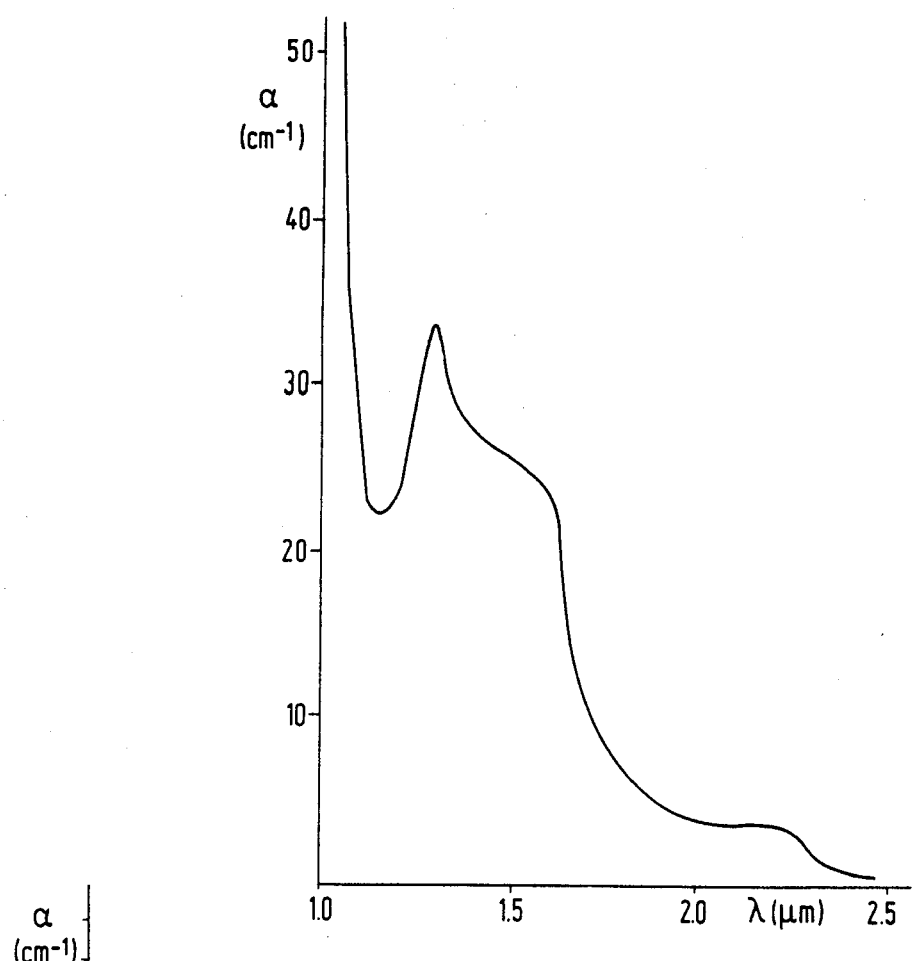
Figure 4:
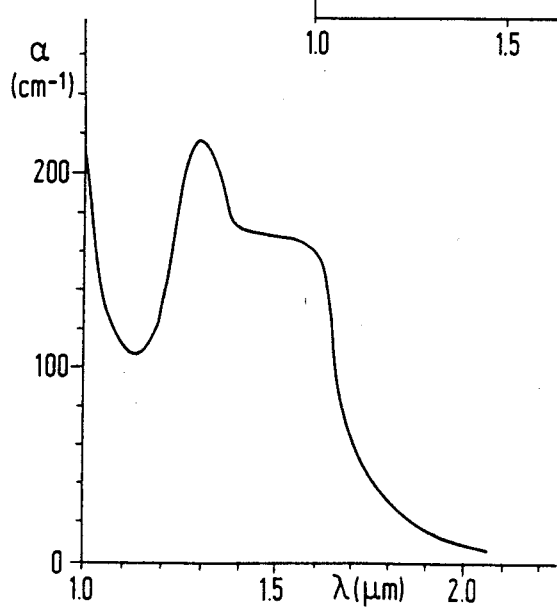

Absorption measurements for radiation in the wavelength of $1.0 \leq \lambda \leq 2.5$ $\mu$m were likewise performed with layers of the compositions $$Y_3Fe_{4.939}Co_{0.018}Ge_{0.042}O_{12} \qquad \text{(FIG. 3)}$$

and $$Y_3Fe_{4.73}O_{0.12}Si_{0.15}O_{12} \qquad \text{(FIG. 4)}$$

and a layer thickness $d \approx 100$ $\mu$m (compare FIGS. 3 and 4). The reference $\alpha$ denotes the absorption coefficient for the relevant layers.

What is claimed is:

1. A planar optical waveguide having a crystal body consisting of a nonmagnetic substrate having a first magnetooptical layer epitaxially provided on the substrate and a second magnetooptical layer epitaxially provided on the first magnetooptical layer, the two magnetooptical layers consisting of a material based on iron garnet, the second magnetooptical layer having a refractive index $n_2$ which is approximately $1 \times 10^{-3}$ to $1 \times 10^{-2}$ higher than the refractive index $n_1$ of the first magnetooptical layer; characterized in that a layer (5) of a material based on iron garnet and absorbing radiation in the wavelength of $1.0 \leq \lambda \leq 2.5$ $\mu$m is provided between the substrate (3) and the first magnetooptical layer (7), said iron garnet-based layer having a refractive index $n_A$ which is higher than the refractive index of the first magnetooptical layer.

2. A planar optical waveguide as claimed in claim 1, characterized in that the material for the magnetooptical layers has as composition defined by the general formula $Y_{3-x}Pb_xFe_5O_{12}$ where $x = 0.007$ to $0.025$ for the first magnetooptical layer (7) adjoining the absorption layer (5) and where $x = 0.02$ to $0.04$ for the second magnetooptical layer (9) provided on the first magnetooptical layer.

3. A planar optical waveguide as claimed in claim 2, characterized in that in the material of the absorption layer (5) at least a substituent in the form of a cation which can occupy dodecahedral, octahedral or tetrahedral lattice sites is present in the garnet lattice.

4. A planar optical waveguide as claimed in claim 3, characterized in that the absorption layer (5) has a composition defined by the general formula $Y_3Fe_{5-x-y-z}A_xD_yM_zO_{12}$ in which
   $A = Co^{III}$,
   $D = Co^{III}$,
   $M = Si^{IV}, Ge^{IV}, Ti^{IV}, Zr^{IV}$ or mixtures of these ions
   where
   $0 \leq x \leq 0.3$
   $0 \leq y \leq 0.3$
   $z \geq y$
   $0 \leq y + z \leq 0.6$
   $x + y + z \leq 0.6$
   $x + y > 0$
   and where $z = 0$ when $y = 0$.

5. A planar optical waveguide as claimed in claim 4, characterized in that the absorption layer (5) has a composition defined by the formula $Y_3Fe_{4.9}Co_{0.1}O_{12}$.

6. A planar optical waveguide as claimed in claim 4, characterized in that the absorption layer (5) has a composition defined by the formula $Y_3Fe_{4.939}Co_{0.018}Ge_{0.042}O_{12}$.

7. A planar optical waveguide as claimed in claim 4, characterized in that the absorption layer (5) has a composition defined by the formula $Y_3Fe_{4.73}Co_{0.12}Si_{0.15}O_{12}$.

8. A planar optical waveguide as claimed in claim 4 characterized in that the absorption layer (5) has a thickness of $\leq 100$ μm.

9. A planar optical waveguide as claimed in claim 4, characterized in that the substrate (3) has a composition defined by the formula $Gd_3Ga_5O_{12}$.

10. A planar optical waveguide comprising:
    a nonmagnetic substrate;
    an absorption layer epitaxially provided on the substrate, said absorption layer being an iron garnet, said absorption layer absorbing radiation in the wavelength range from 1.0 to 2.5 microns, said absorption layer having a refractive index $n_A$;
    a first magnetooptical layer epitaxially provided on the absorption layer, said first magnetooptical layer being an iron garnet, said first magnetooptical layer having a refractive index $n_1$ which is less than $n_A$; and
    a second magnetooptical layer epitaxially provided on the first magnetooptical layer, said second magnetooptical layer being an iron garnet, said second magnetooptical layer having a refractive index $n_2$ which is approximately $1 \times 10^{-3}$ to $1 \times 10^{-2}$ times greater than $n_1$.

11. A planar optical waveguide as claimed in claim 10, characterized in that the waveguide is a single mode waveguide.

12. A planar one-way optical waveguide comprising:
    a nonmagnetic substrate;
    an absorption layer epitaxially provided on the substrate, said absorption layer being an iron garnet, said absorption layer absorbing radation in the wavelength range from 1.0 to 2.5 microns, said absorption layer having a refractive index $n_A$;
    a first magnetooptical layer epitaxially provided on the absorption layer, said first magnetooptical layer being an iron garnet, said first magnetooptical layer having a refractive index $n_1$ which is less than $n_A$; and
    a second magnetooptical layer epitaxially provided on the first magnetooptical layer, said second magnetooptical layer being an iron garnet, said second magnetooptical layer having a refractive index $n_2$ which is approximately $1 \times 10^{-3}$ to $1 \times 10^{-2}$ times greater than $n_1$.

13. A planar optical waveguide as claimed in claim 12, characterized in that the waveguide is a single mode waveguide.

14. A method of manufacturing a planar optical waveguide, said method comprising the steps of:
    providing a nonmagnetic substrate;
    epitaxially depositing an absorption layer on the substrate, said absorption layer being an iron garnet, said absorption layer absorbing radiation in the wavelength range from 1.0 to 2.5 microns, said absorption layer having a refractive index $n_A$;
    epitaxially depositing a first magnetooptical layer on the absorption layer, said first magnetooptical layer being an iron garnet, said first magnetooptical layer having a refractive index $n_1$ which is less than $n_A$; and
    epitaxially depositing a second magnetooptical layer on the first magnetooptical layer, said second magnetooptical layer being an iron garnet, said second magnetooptical layer having a refractive index $n_2$ which is approximately $1 \times 10^{-3}$ to $1 \times 10^{-2}$ times greater than $n_1$.

15. A method as claimed in claim 14, characterized in that an absorption layer having a composition defined by the general formula $Y_3Fe_{5-x-y-z}A_xD_yM_zO_{12}$ is deposited on the substrate, in which
    $A = Co^{III}$,
    $D = Co^{II}$,
    $M = Si^{IV}, Ge_{IV}, Ti^{IV}, Zr^{IV}$ or mixtures of these ions,
    where
    $0 \leq x \leq 0.3$
    $0 \leq y \leq 0.3$
    $z \geq y$
    $0 \leq y + z \leq 0.6$
    $x + y + z \leq 0.6$
    $x + y > 0$
    and where $z = 0$ when $y = 0$.

16. A method as claimed in claim 11, characterized in that an absorption layer defined by the formula $Y_3Fe_{4.9}Co_{0.1}O_{12}$ is deposited on the substrate.

17. A method as claimed in claim 11, characterized in that an absorption layer defined by the formula $Y_3Fe_{4.939}Co_{0.018}Ge_{0.042}O_{12}$ is deposited on the substrate.

18. A method as claimed in claim 11, characterized in that an absorption layer defined by the formula $Y_3Fe_{4.73}Co_{0.12}Si_{0.15}O_{12}$ is deposited on the substrate.

19. A method as claimed in claim 11, characterized in that a substrate of the composition $Gd_3Ga_5O_{12}$ is used.

20. A method as claimed in claim 12, characterized in that the waveguide is a single mode waveguide.

* * * * *